United States Patent
Shao et al.

(10) Patent No.: US 11,746,057 B2
(45) Date of Patent: Sep. 5, 2023

(54) COMPOSITE FORMED OF CUBIC BORON NITRIDE WITHOUT TI-BASED CERAMIDE AND METHOD OF MAKING THEREOF

(71) Applicant: DIAMOND INNOVATIONS, INC., Worthington, OH (US)

(72) Inventors: Rui Shao, Dublin, OH (US); Lawrence Dues, Dublin, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 92 days.

(21) Appl. No.: 17/156,555

(22) Filed: Jan. 23, 2021

(65) Prior Publication Data
US 2021/0238098 A1    Aug. 5, 2021

Related U.S. Application Data

(60) Provisional application No. 62/968,479, filed on Jan. 31, 2020.

(51) Int. Cl.
*C04B 35/563* (2006.01)
*B23B 27/14* (2006.01)
(Continued)

(52) U.S. Cl.
CPC .......... *C04B 35/563* (2013.01); *B23B 27/148* (2013.01); *C04B 35/6264* (2013.01); *C04B 35/6268* (2013.01); *C04B 35/645* (2013.01); *B23B 2226/18* (2013.01); *C04B 2235/3217* (2013.01); *C04B 2235/386* (2013.01); *C04B 2235/3813* (2013.01); *C04B 2235/3856* (2013.01); *C04B 2235/3865* (2013.01); *C04B 2235/606* (2013.01)

(58) Field of Classification Search
None
See application file for complete search history.

(56) References Cited

U.S. PATENT DOCUMENTS 5,332,629 A * 7/1994 Sumiya ............... H01L 23/3731
                                                          257/E23.113
2012/0329632 A1   12/2012 Malik
(Continued)

FOREIGN PATENT DOCUMENTS

EP    1359130    11/2003
EP    3214059    9/2017
(Continued)

OTHER PUBLICATIONS

Handymath.com Percentage by Volume to Percentage by Weight Conversion Calculator for cBN-65 ZrC-15 Al2O3-15 WB-5 (Year: 2022).*

(Continued)

*Primary Examiner* — Bryan D. Ripa
*Assistant Examiner* — Ross J Christie

(57) ABSTRACT

A cubic boron nitride (cBN)-based composite including about 30-65 vol. % cBN, about 3-30 vol. % zirconium (Zr)-containing compounds, about 0-10 vol. % cobalt-tungsten-borides ($Co_xW_yB_z$), about 2-30 vol. % aluminum oxide ($Al_2O_3$), about 0.5-10 vol. % tungsten borides, and less than or equal to about 5 vol. % aluminum nitride (AlN).

5 Claims, 5 Drawing Sheets

(51) Int. Cl.
*C04B 35/626* (2006.01)
*C04B 35/645* (2006.01)

(56) References Cited

U.S. PATENT DOCUMENTS

2013/0029175 A1* 1/2013 Umemura ............. C04B 35/581
428/627
2018/0155250 A1* 6/2018 Hakeem ................ C04B 35/597

FOREIGN PATENT DOCUMENTS

EP   3239116   11/2017
JP   S5562863   5/1980

OTHER PUBLICATIONS

Handymath.com Percentage by Volume to Percentage by Weight Conversion Calculator for cBN-30 ZrC-30 Al2O3-30 WB-10 (Year: 2022).*

Handymath.com "Percentage by Volume to Percentage by Weight Conversion Calculator for cBN-65 ZrCN ZrB2 Al2O3 WB" (Year: 2022).*

Handymath.com "Percentage by Volume to Percentage by Weight Conversion Calculator for cBN-30 ZrCN ZrB2 Al2O3 WB" (Year: 2022).*

* cited by examiner

COMPOSITE FORMED OF CUBIC BORON NITRIDE WITHOUT TI-BASED CERAMIDE AND METHOD OF MAKING THEREOF

TECHNICAL FIELD AND INDUSTRIAL APPLICABILITY

The present disclosure relates generally to composite materials formed of cubic boron nitride and methods of making and using the same. Specifically, the present disclosure relates to such composite materials that are useful in machining of difficult-to-cut materials.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Cubic boron nitride (cBN) is a super-hard material that is often used to form cBN-based composites for cutting and/or machining applications, Certain ceramic materials, such as alumina ($Al_2O_3$), titanium nitride (TiN), silicon nitride ($Si_3N_4$), etc. may be blended with cBN to improve the resistance to chemical wear. However, such ceramic materials may not possess sufficient hardness and/or thermal resistance to perform optimally when machining hard materials. For example, existing cBN-based composites may still exhibit rapid wear, fracture, and/or failure when cutting or machining difficult-to-cut materials, especially heat resistant superalloys. Therefore, there is a need for a better cBN-based composite material with improved properties for cutting and machining difficult-to-cut materials.

SUMMARY

Provided is, a cubic boron nitride (cBN)-based composite including about 30-65 vol. % cBN, about 3-30 vol. % zirconium (Zr)-containing compounds, about 0-10 vol. % cobalt-tungsten-borides ($Co_xW_yB_z$), about 2-30 vol. % aluminum oxide ($Al_2O_3$), about 0.5-10 vol. % tungsten borides, and less than or equal to about 5 vol. % aluminum nitride (AlN).

Also provided is, a method of forming a cubic boron nitride (cBN)-based composite. The method includes mixing powders of a cBN-based formulation for forming the cBN-based composite to form a first mixture. The cBN-based composite includes about 30-65 vol. % cBN, about 3-30 vol. % zirconium (Zr)-containing compounds, about 0-10 vol. % cobalt-tungsten-borides ($Co_xW_yB_z$), about 2-30 vol. % aluminum oxide ($Al_2O_3$), about 0.5-10 vol. % tungsten borides, and less than or equal to about 5 vol. % aluminum nitride (AlN). The method includes drying the first mixture to form a second mixture and loading the second mixture into one or more refractory molds. The method also includes sintering the second mixture at high-pressure-high-temperature conditions.

Further provided is a cutting tool includes a sintered cubic boron nitride (cBN)-based compact. The cBN-based compact includes about 30-65 vol. % cBN, about 3-30 vol. % zirconium (Zr)-containing compounds, about 0-10 vol. % cobalt-tungsten-borides ($Co_xW_yB_z$), about 2-30 vol. % aluminum oxide ($Al_2O_3$), about 0.5-10 vol. % tungsten borides, and less than or equal to about 5 vol. % aluminum nitride (AlN). The sintered compact is formed by mixing powders of a cBN-based formulation for forming the sintered cBN-based compact to form a first mixture, drying the first mixture to form a second mixture, loading the second mixture into one or more refractory molds, and sintering the second mixture at high-pressure-high temperature conditions to form the sintered compact.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

DETAILED DESCRIPTION

Figure 1:
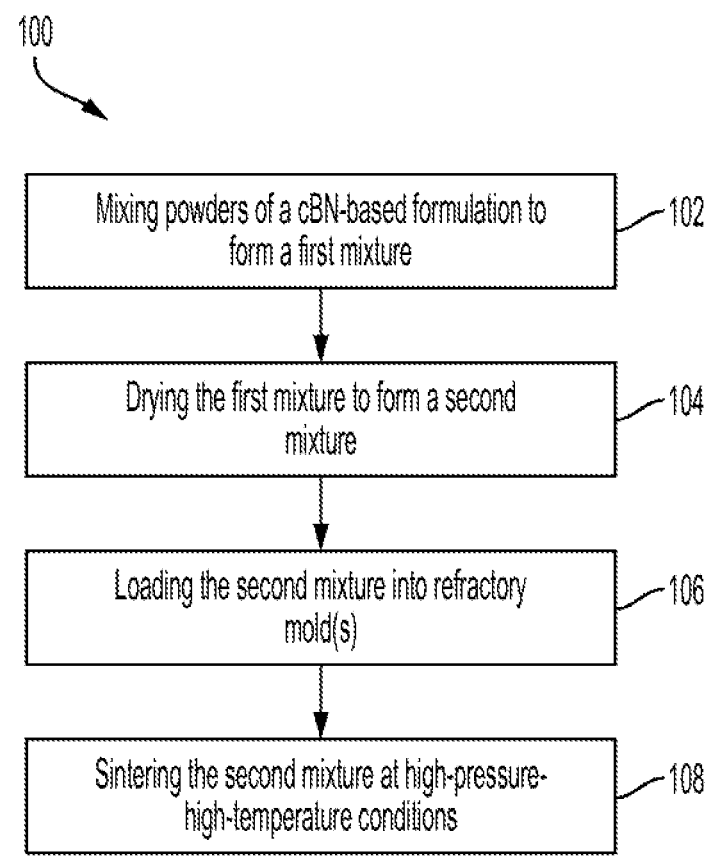
FIG. 1 shows an exemplary process for forming a cBN-based sintered compact or composite.
Figure 2:
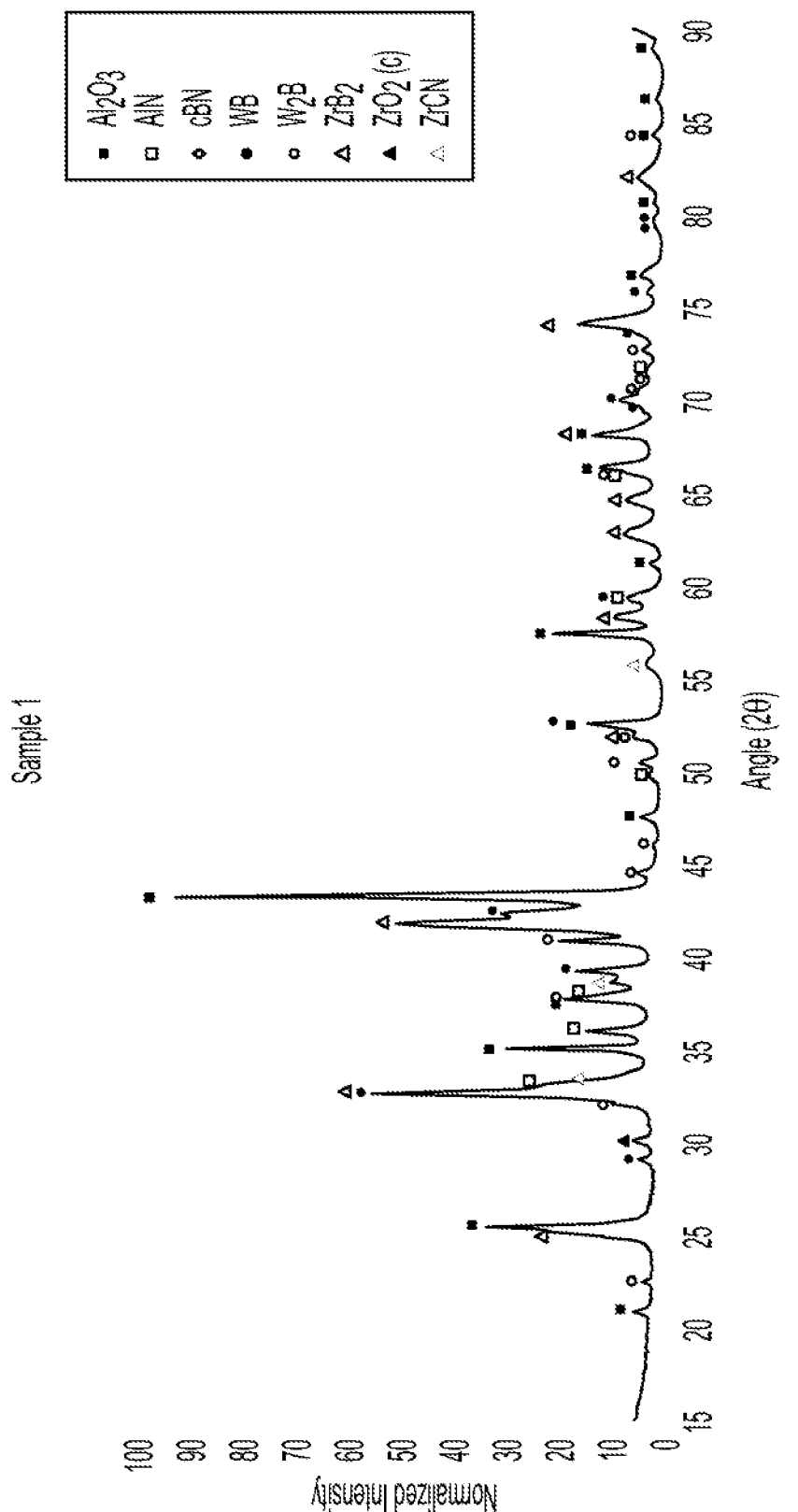
FIG. 2 shows an XRD spectrum showing phases present in an exemplary cBN-based sintered compact or composite.
Figure 3:
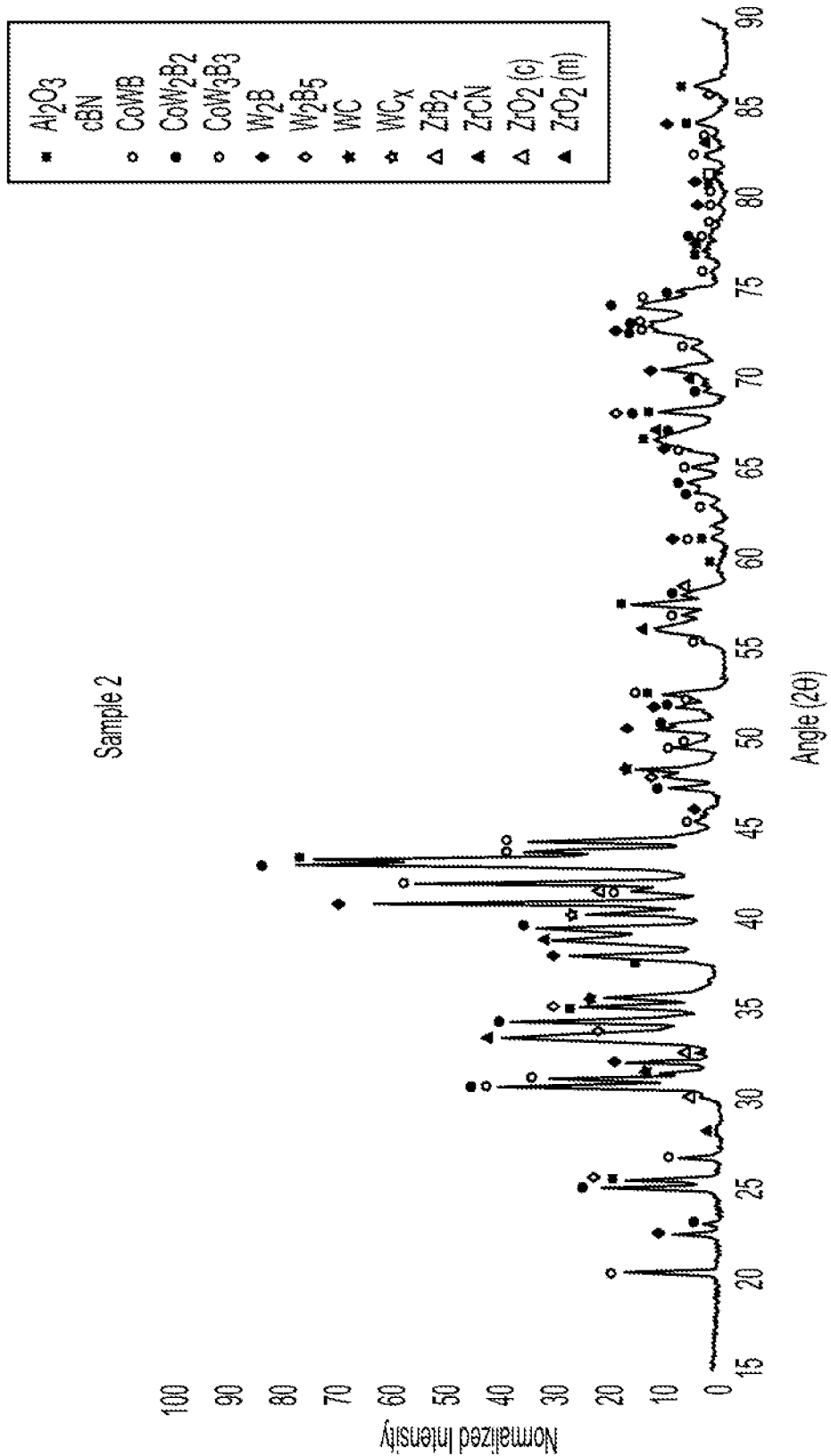
FIG. 3 shows an XRD spectrum showing phases present in another exemplary cBN-based sintered compact or composite.
Figure 4:
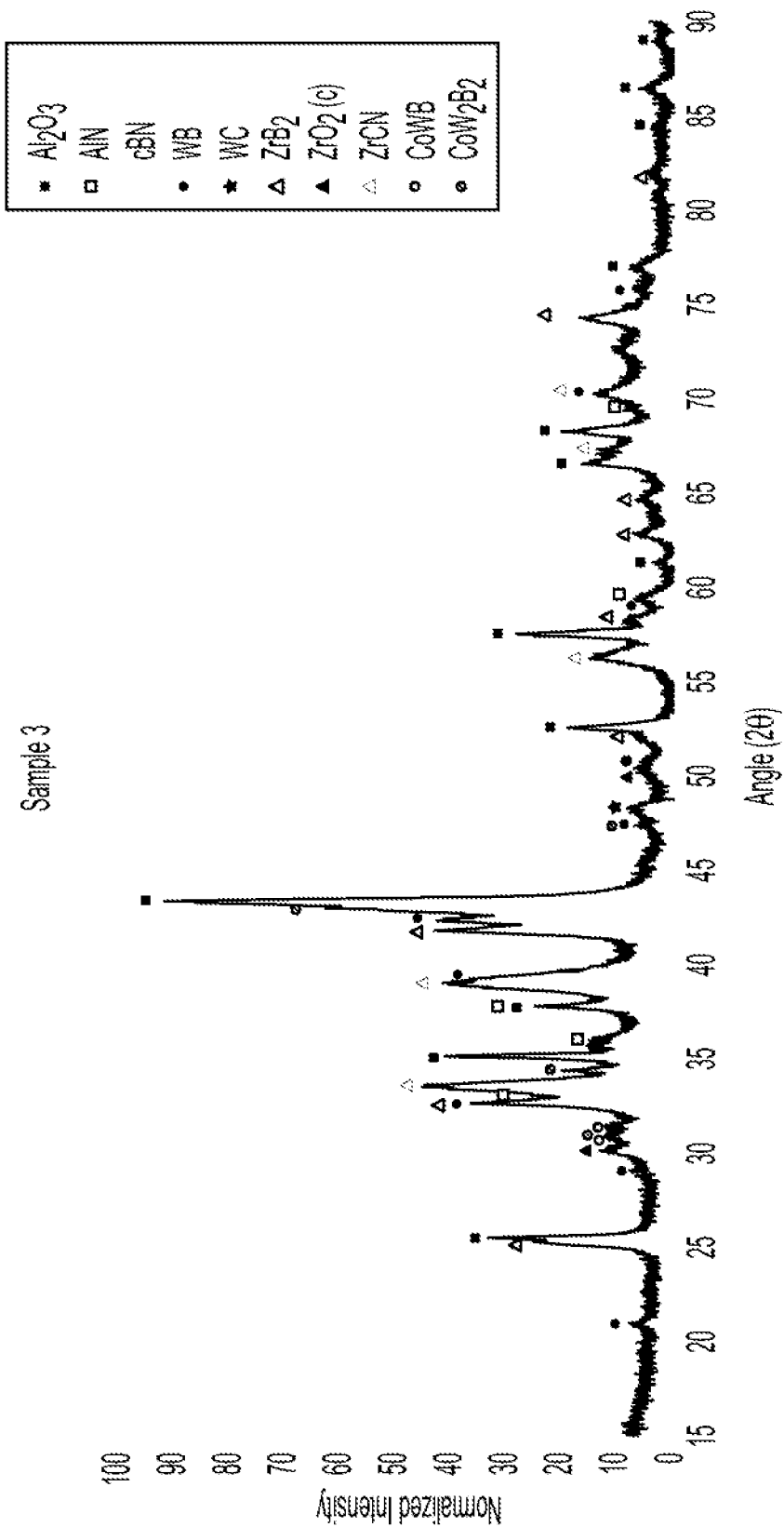
FIG. 4 shows an XRD spectrum showing phases present in another exemplary cBN-based sintered compact or composite.
Figure 5:
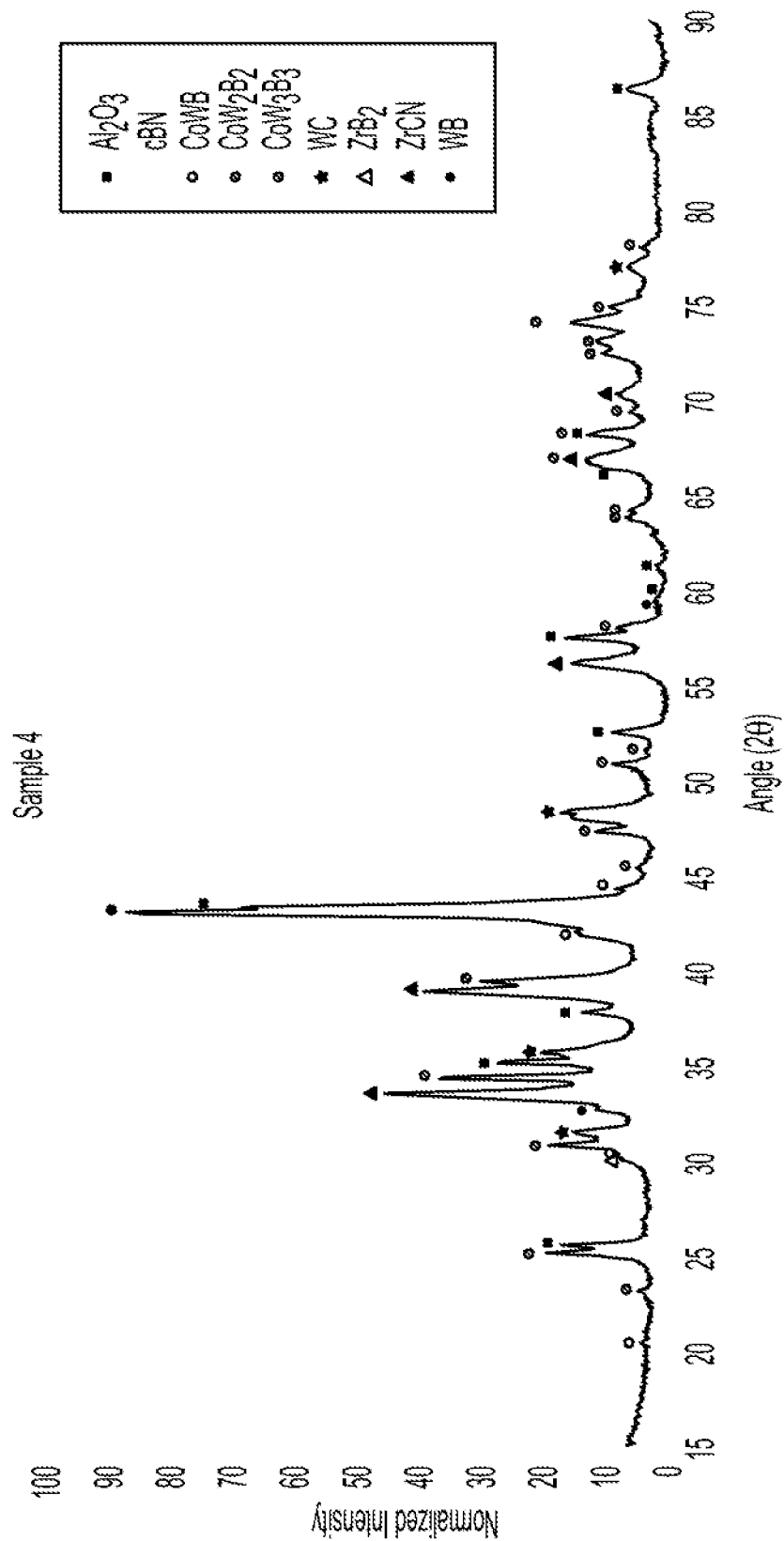
FIG. 5 shows an XRD spectrum showing phases present in another exemplary cBN-based sintered compact or composite.

The disclosure relates to composites or sintered compacts formed of cubic boron nitride (cBN) and methods of making and using the same. Specifically, the present disclosure relates to improved cBN-based composite materials that are useful in cutting and machining difficult-to-cut materials, for example, superalloys for applications requiring high strength in high temperature ranges. For example, the cBN-based composite materials (e.g., sintered compacts) disclosed herein may be used for cutting and/or machining nickel-based superalloys (e.g., Inconel 718, Inconel 625), cobalt-based superalloys (e.g., Alloy 188, Haynes 25, Alloy L605), iron-based superalloys (e.g., A286), or any materials of equivalent, inferior, or superior mechanical properties than these superalloys.

The cBN-based composite materials disclosed herein can include, among other improvements, greater abrasion resistance, toughness, chemical resistance, hardness, and/or hot hardness. These improvements are at least partially attributed to the combination of cBN, cobalt-tungsten-borides ($Co_xW_yB_z$), tungsten borides (WB, $W_2B$, $W_2B_5$, or a combination thereof), alumina ($Al_2O_3$), and zirconium (Zr)-containing compounds (zirconium dioxide, zirconium nitride, zirconium carbide, zirconium carbo-nitride, zirconium diboride, or a combination thereof) in the proportions disclosed herein. The disclosure also describes methods for forming the cBN-based formulations into sintered compacts, which can be used for cutting or machining of difficult-to-cut materials.

With the foregoing in mind, Tables 1 and 2 list exemplary compositions of the cBN-based composite materials (e.g., sintered compacts). An exemplary process for forming the cBN-based composite materials is depicted in the flow diagram of FIG. 1. In Tables 1 and 2, all volume percent (vol. %) listed are based on the total vol. % of the cBN-based composite material.

TABLE 1

| Materials | Min (vol. %) | Max (vol %) |
|---|---|---|
| cBN | 30 | 65 |
| $Co_xW_yB_z$ | 0 | 15 |
| tungsten borides | 0.5 | 10 |
| $Al_2O_3$ | 2 | 30 |
| Zr-containing compounds | 2 | 30 |
| AlN | 0 | 5 |

TABLE 2

| Materials | Min (vol. %) | Max (vol. %) |
|---|---|---|
| cBN | 45 | 55 |
| $Co_xW_yB_z$ | 3 | 15 |
| tungsten borides | 1 | 3 |
| $Al_2O_3$ | 5 | 25 |
| Zr-containing compounds | 8 | 15 |
| AlN | 0 | <1 |

The cBN-based composite materials (e.g., sintered compacts) may include about 30-65 vol. % cBN, about 40-60 vol. % cBN, about 45-55 vol. % cBN, about 50 vol. % cBN, or about 60 vol. % cBN. Additionally, the cBN-based composite materials may include about 0-15 vol. % (e.g., about 0.1-15 vol. %) $Co_xW_yB_z$, about 0-10 vol. % (e.g., about 0.1-10 vol. %) $Co_xW_yB_z$, about 3-15 vol. % $Co_xW_yB_z$, about 3-12 vol. % $Co_xW_yB_z$, or about 3-8 vol. % $Co_xW_yB_z$. Further, the cBN-based composite materials may include about 0.5-10 vol. % tungsten borides, about 0.5-6 vol. % tungsten borides, about 3-8 vol. % tungsten borides, or about 1-3 vol. % tungsten borides. As provided, the cBN-based composite materials may include about 2-30 vol. % $Al_2O_3$, about 5-25 vol. % $Al_2O_3$, about 2-15 vol. % $Al_2O_3$, about 10-20 vol. % $Al_2O_3$, or about 5-10 vol. % $A_2O_3$. The cBN-based composite materials may also include about 2-30 vol. % Zr-containing compounds, about 5-25 vol. % Zr-containing compounds, about 8-15 vol. % Zr-containing compounds, or about 3-15 vol. % Zr-containing compounds. In addition, the cBN-based composite materials may include less than or equal to about 5 vol. % aluminum nitride (AlN) (e.g., about 0.01-5 vol. % AlN, about 0.01-4 vol. % AlN, about 0.01-3 vol. % AlN, or about 0.01-1 vol. % AlN). The tungsten borides disclosed herein may include WB, $W_2B$, $W_2B_5$, or a combination thereof. The Zr-containing compounds disclosed herein may include zirconium dioxide ($ZrO_2$), zirconium nitride (ZrN), zirconium carbide, (ZrC), zirconium carbo-nitride (ZrCN), zirconium diboride ($ZrB_2$), or a combination thereof. The $ZrO_2$ can be in cubic phase (c-$ZrO_2$), monoclinic phase (m-$ZrO_2$), and/or tetragonal phase.

FIG. 1 depicts an exemplary process 100 of forming the cBN-based composite materials (e.g., sintered compacts), The exemplary process 100 includes mixing powers of a cBN-based formulation to form a first mixture (step 102). The cBN-based formulation may comprise or consist of one or more powdered formulations including, e.g., a powder comprising or consisting of cBN, a powder comprising or consisting of zirconium, such as a powder comprising zirconium oxide (could be cubic, monoclinic, and/or tetragonal phases), ZrN, ZrC, ZrCN, and/or $ZrB_2$, a powder comprising or consisting of aluminum, such as a powder comprising $Al_2O_3$ and/or AlN, a powder comprising or consisting of W, a powder comprising or consisting of Co, a powder comprising or consisting of B, and combinations thereof. Step 102 includes providing powders that can be used to form the cBN-based composite materials disclosed herein (e.g., compositions shown in Tables 1 and 2). The powders can be nano- and/or micron-sized powers, for example, the average particle sizes of the powers of the cBN-based formulation can be in nanometer (nm) or micrometer (μm) ranges, i.e., about 100 nm-6 μm. Step 102 can include mixing the powders to form a mixture or slurry. The powders can be mixed using any suitable milling or blending techniques (e.g., attribution mill, ball mill, etc.). The powders can be milled or blended in any suitable solvents, for example, ethanol, isopropanol, acetone, methanol, hexane, heptane, or a combination thereof to form the first mixture. The milling conditions (e.g., time, rotation per minute, types of medium or solvent, etc.) can be adjusted or tuned according to the size and/or type of the mill used to achieve desired mixing effects (e.g., powder distribution and uniformity).

The process 100 can include drying the first mixture to form a second mixture (step 104). The first mixture or slurry formed in step 102 can be dried using any suitable techniques, for example, vacuum dry, air dry, etc., to substantially remove the solvents and/or binders in the first mixture.

The process 100 can include loading the second mixture into refractory mold(s) (step 106). The refractory mold(s) can be made of any suitable materials, including any suitable refractory metals, for example, tantalum, niobium, molybdenum, etc. Step 106 can include loading the second mixture into the refractory mold and capping with a cemented carbide (WC-Co) disc that fits snugly within the opening of the mold. Step 106 can also include sealing the refractory mold(s) containing the second mixture and/or the WC-Co substrate/disc.

The process 100 can include sintering the second mixture at high-pressure-high-temperature conditions (step 108). The sealed refractory mold(s) containing the second mixture can be placed in a high-pressure-high-temperature (HPHT) cell and HPHT sintering conditions are applied to form the cBN-based composite materials (e.g., sintered compacts) disclosed herein. Step 108 can include sintering the second mixture at pressures about 5 gigapascal (GPa)-8 GPa and at temperatures about 1300-1600° C. Step 108 can include sintering the second mixture at a pressure of at least 4 GPa and at a temperature of at least 1100° C. The cBN-based composite materials (e.g., sintered compacts) can have cBN grain sizes in nanometer or submicron range, for example about 0.1-10 μm, about 0.1-8 μm, about 0.1-6 μm, about 0.1-4 μm, about 0.1-2 μm, about 2-4 μm, about 0.1-1 μm, about 0.8-1.2 μm, or about 1 μm.

The cBN-based composite materials (e.g., sintered compacts) formed according to the process 100 can be used for cutting or machining difficult-to-cut materials. For example, the cBN-based composite materials formed according to process 100 can be formed into cutting tools for cutting and/or machining high-strength superalloys, including nickel-based superalloys (e.g., Inconel 718, Inconel 625), cobalt-based superalloys (e.g., Alloy 188, Haynes 25, Alloy L605), iron-based superalloys (e.g., A286), or any materials of equivalent, inferior, or superior mechanical properties than these superalloys.

Without wishing to be bound by any particular theory, it is believed that the compositions and phases of the cBN-based composite materials (e.g., sintered compacts) disclosed herein can contribute to improving the abrasion resistance, toughness, chemical resistance, hardness, hot hardness, or a combination thereof, thereby improving the cutting and machining capabilities. Table 3 shows exemplary cutting performances using cutting tools made of the cBN-based composite materials (e.g., sintered compacts) disclosed herein.

TABLE 3

| Sample | cBN grain size (μm) | cBN vol. % | Major phases Al | Zr | W | Co | Ti | Cut distance (km) |
|---|---|---|---|---|---|---|---|---|
| Sample 1 | 2-4 | 60 | $Al_2O_3$ AlN | $ZrB_2$ | WB, $W_2B$ | none | none | 0.8 |
| Sample 2 | 0-2 | 60 | $Al_2O_3$ | ZrCN | $W_2B$, $W_2B_5$, $CoW_2B_2$, CoWB | $CoW_2B_2$, CoWB | none | 1.0 |
| Sample 3 | 0-1 | 50 | $Al_2O_3$ | $ZrB_2$, ZrCN | WB, $CoW_2B_2$, CoWB | $CoW_2B_2$ CoWB | none | 1.3 |
| Sample 4 | 0-1 | 50 | $Al_2O_3$ | ZrCN | WB, WC, $CoW_2B_2$, CoWB | $CoW_2B_2$ CoWB | none | 1.0 |
| Sample 5 | 1 | 50 | $Al_2O_3$ | none | WC | none | TiCN, TiN | 0.7 |

In the illustrated examples, Samples 1-5 represent cutting tool made of the cBN-based composite materials (e.g., the sintered compacts) formed based on compositions shown in Tables 1 and 2 and process 100 described in FIG. 1. The cutting tests were performed on Inconel 718 at a speed of 350 meters per minute (n/min) and a feed rate of 0.15 millimeter per revolution (mm/revolution) with coolant being continuously applied to the cutting interface. The cutting tests were performed for a predetermined flank wear of 0.25 mm for Samples 1-5. The cut distances in kilometer (km) at the end of tool life are shown in the right most column in Table 3.

Sample 1 and Sample 2 both contain cBN about 60 vol. %, an Al-containing phase or compound ($Al_2O_3$ and/or AlN), a Zr-containing phase or compound (ZrCN and/or $ZrB_2$), and a W-containing phase or compound (WB, $W_2B$, $W_2B_5$, $CoW_2B_2$, and/or CoWB), and both do not contain a titanium (Ti)-containing phase or compound. A difference between Sample 1 and Sample 2 is that Sample 2 contains $W_2B_5$ and $Co_xW_yB_L$ ($CoW_2B_2$, $CoW_3B_3$, and/or CoWB) whereas Sample 1 does not, and Sample 2 has a slightly smaller sintered grain size. The cut distances are 0.8 km for Sample 1 and 1.0 km for Sample 2. Sample 3 and Sample 4 both contain cBN about 50 vol. %, an Al-containing phase or compound ($Al_2O_3$), a Zr-containing phase or compound (ZrCN and/or $ZrB_2$), a W-containing phase or compound (WB, WC, $CoW_2B_2$, $CoW_3B_3$ and/or CoWB), and a Co-containing phase or compound ($CoW_2B_2$, $CoW_3B_3$, and/or CoWB), and both do not contain a Ti-containing phase or compound. A difference between Sample 3 and Sample 4 is that Sample 3 contains $ZrB_2$ whereas Sample 4 does not, and Sample 4 contains WC whereas Sample 3 does not. The cut distances are 1.3 km for Sample 3 and 1.0 km for Sample 4. Although Sample 5 also contains about 50 vol. % cBN, Sample 5 is different from Samples 1-4 in that Sample 5 contains a Ti-containing phase or compound (titanium carbo-nitride (TiCN) and/or titanium nitride (TiN)), and does not contain a Zr-containing phase or compound and $Co_xW_yB_z$. The cut distances for Sample 5 is 0.7 km.

Without wishing to be bound by any particular theory, it is believed that the presence of $Al_2O_3$, the presence of $Co_xW_yB_z$, the presence of tungsten borides, and the presence of the Zr-containing compounds can contribute to improved cutting capabilities. It is also believed that cBN-based composite materials with relatively lower cBN contents (e.g., about 50 vol. %, about 45-55 vol. %) can have better cutting capabilities than that with relatively higher cBN contents (e.g., about 60 vol. %, about 65 vol. %), It is also believed that in some embodiments, the cBN-based composite materials including $Al_2O_3$, $Co_xW_yB_z$, tungsten borides, and Zr-containing compounds, and free or substantially free of Ti-containing compounds (e.g., titanium nitride (TiN), titanium carbo-nitride (TiCN), titanium carbide (TiC), titanium-carbo-oxinitride (TiCON), titanium-oxinitride (TiNO), or a combination thereof), can have better cutting capabilities than that with titanium (Ti)-containing binders but without tungsten borides and/or $Co_xW_yB_z$.

Without wishing to be bound by any particular theory, it is believed that the specific combinations and/or exclusions of certain crystalline phases can contribute to the enhanced cutting capabilities of the cBN-based composite materials (e.g., sintered compacts) disclosed herein. For example, the $Co_xW_yB_z$ are present in the cBN-based composite materials (e.g., sintered compacts) as crystalline phases, thereby contributing to the improved cutting capabilities. For example, the $Co_xW_yB_7$ may be present as one or more of crystalline CoWB, crystalline $CoW_2B_2$, and/or crystalline $CoW_3B_3$. For example, the Zr-containing compounds are present in the cBN-based composite materials (e.g., sintered compacts) as $ZrB_2$ and/or ZrCN, thereby contribute to the improved cutting capabilities. For example, the tungsten borides (such as WB, $W_2B$, and $W_2B_5$) are present in the cBN-based composite materials (e.g., sintered compacts), thereby contributing to the improved cutting capabilities.

In some embodiments, the cBN-based composite materials (e.g., sintered compacts) disclosed herein can be substantially free of or exclude aluminum nitride (AlN) and/or aluminum diboride ($AlB_2$). In some embodiments, the cBN-based composite materials (e.g., sintered compacts) disclosed herein can be substantially free of or exclude titanium (Ti)-containing compounds or phases (e.g., TiCN, TiN). In some embodiments, the cBN-based composite materials (e.g., sintered compacts) disclosed herein can include a very low content or negligible amount of AlN, e.g., less than 1 vol. % AlN. In some embodiments, the cBN-based composite materials (e.g., sintered compacts) disclosed herein can include $Al_2O_3$ and Zr-containing compounds. In some embodiments, the cBN-based composite materials (e.g., sintered compacts) disclosed herein can be substantially free of or exclude $W_2C_{21}B_6$.

X-ray diffraction (XRD) can be performed on the cBN-based composite materials (e.g., sintered compacts) disclosed herein to identify the phases present. FIGS. 2, 3, 4, and 5 show XRD spectra from Sample 1, Sample 2, Sample 3, and Sample 4, respectively. The XRD spectra of FIG. 2 verifies that Sample 1 contains cBN and other major phases including $Al_2O_3$, AlN, $ZrB_2$, WB, and $W_2B$. The XRD spectra of FIG. 3 verifies that Sample 2 contains cBN and other major phases including $Al_2O_3$, ZrCN, $W_2B$, $W_2B_5$, CoWB, and $CoW_2B_2$. As also shown in the XRD spectra of FIG. 3, $CoW_3B_3$ is present. The XRD spectra of FIG. 4 verifies that Sample 3 contains cBN and other major phases including $Al_2O_3$, $ZrB_2$, ZrCN, WB, $CoW_2B_2$, and CoWB. The XRD spectra of FIG. 5 verifies that Sample 4 contains cBN and other major phases including $Al_2O_3$, ZrCN, WB, WC, $CoW_2B_2$, and CoWB. As also shown in the XRD spectra of FIG. 5, $CoW_3B_3$ is present.

Unless defined otherwise all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a," "an" and "at least one" are used interchangeably in this application.

Unless otherwise indicated, all numbers expressing quantities of ingredients, properties such as size, weight, reaction conditions and so forth used in the specification and claims are to the understood as being modified in all instances by the term "about". As throughout the application, the term "about" may mean plus or minus 10% of the numerical value of the number with which it is being used; therefore, about 50% may mean in the range of 45%-55%. Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

Throughout the application, descriptions of various embodiments use "comprising" language; however, it will be understood by one of skill in the art, that in some instances, an embodiment can alternatively be described using the language "consisting essentially of" or "consisting of."

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A cubic boron nitride (cBN)-based composite, consisting of:
    about 30-65 vol. % cBN;
    about 3-30 vol. % zirconium (Zr)-containing compounds comprising at least zirconium carbo-nitride (ZrCN) or zirconium diboride ($ZrB_2$);
    about 0-10 vol. % cobalt-tungsten-borides ($Co_xW_yB_z$);
    about 2-30 vol. % aluminum oxide ($Al_2O_3$);
    about 0.5-10 vol. % tungsten borides; and
    less than or equal to about 5 vol. % aluminum nitride (AlN), wherein the cBN-based composite excludes Ti-containing compounds.

2. The cBN-based composite of claim 1, wherein the $Co_xW_yB_z$ is selected from the group consisting of crystalline CoWB, crystalline $CoW_2B_2$, and crystalline $CoW_3B_3$.

3. The cBN-based composite of claim 1, wherein the $Co_xW_yB_z$ excludes $W_2Co_{21}B_6$.

4. A cutting tool for cutting superalloys, comprising the cBN-based composite of claim 1.

5. The cBN-based composite of claim 1, wherein the cBN has a grain size of about 0.1 micrometer (µm)-4 µm.

* * * * *